United States Patent
Farmiga et al.

[19]

[11] Patent Number: 5,825,558
[45] Date of Patent: Oct. 20, 1998

[54] THREE-DIMENSIONAL UNIVERSAL MOUNTING COMPONENT SYSTEM FOR OPTICAL BREADBOARDS

[75] Inventors: Nestor O. Farmiga, Clifton, N.J.; Kanti Jain, Briarcliff Manor, N.Y.

[73] Assignee: Anvik Corporation, Hawthorne, N.Y.

[21] Appl. No.: 708,209

[22] Filed: Aug. 6, 1996

[51] Int. Cl.[6] .................................................. G02B 7/02
[52] U.S. Cl. ...................... 359/819; 359/822; 359/813
[58] Field of Search .................................. 359/811, 819, 359/808, 809, 822, 827, 813

[56] References Cited

U.S. PATENT DOCUMENTS 5,194,993 3/1993 Bedzyk ..................................... 359/813
5,210,648 5/1993 Bedzyk ..................................... 359/813

OTHER PUBLICATIONS

Winter 1995 Newport Optical Hardware Catalog cover plus pp. 9 and 13.

Primary Examiner—Loha Ben
Attorney, Agent, or Firm—Carl C. Kling

[57] ABSTRACT

A three-dimensional Universal Mounting Component (UMC) system of UMC blocks provides general mounting for use in optical research in constructing layouts for experiments and breadboard-type prototypes. In such optical layouts laser beams or other light beams are directed about complex paths, often on several planes or levels. Use of the invention overcomes the problem of creating three-dimensional optical layouts with less standardized, and much more expensive, mounting adapters and posts. An economical, standardized set of UMC blocks, each with a number of holes in grid configurations, enables users to construct custom three-dimensional optical layouts. Each UMC block is a right rectangular solid of substantial standardized thickness sufficient to support it on edge. Each UMC block has a set of smooth counterbored holes from front to back and has another set of such holes from back to front. These holes allow the UMC blocks to be bolted to each other and to optical breadboards with full recessing of mounting bolts for flush connections. Each UMC block also has a set of tapped holes extending through from front to back to accommodate the direct mounting of optical components. Each UMC block also has at least one set of tapped edge holes for accepting connecting bolts in L- and T-configurations to matching counterbored holes in another appropriately sized UMC block.

11 Claims, 3 Drawing Sheets

2 x 2

2 x 3

3 x 2

3 x 3

3 x 4

4 x 6

4 x 4

4 x 3

THREE-DIMENSIONAL UNIVERSAL MOUNTING COMPONENT SYSTEM FOR OPTICAL BREADBOARDS

TECHNICAL FIELD

This invention relates to optical table auxiliary hardware, and, more particularly, relates to a three-dimensional universal mounting component system for optical breadboards.

BACKGROUND ART

Optical tables are well-known in optical research as bases for building up optical setups for experiments and breadboard-type prototype constructions using laser beams or other light beams, which must be precisely controlled or steered around complex paths. Such optical tables resemble oversize billiard tables, with steel tops having a regular grid pattern of tapped holes. Optical tables or benches are manufactured by various producers, and optical components from various manufacturers can be mounted to these tables because the hole patterns have been standardized. The inch or "standard" optical table features an array of ¼-inch Unified Coarse Series threaded holes (¼-20 UNC-2B) on 1-inch (25.4 mm) centers. The metric optical table, on the other hand, features M6 threaded holes on 25 mm centers. Although the hole dimensions for these two systems are very close (25.4 mm versus 25.0 mm), and ¼-20 threads are very close to the metric M6 standard, the two systems are generally incompatible and mounting hardware must thus be designed for either one or the other, or adapter plates must be used.

It is often convenient to have subassemblies of complex optical layouts mounted on smaller breadboards. Smaller, auxiliary tapped-hole breadboard plates may be used for such purposes. These smaller plates also may be mounted to the optical table as an extension or as a higher surface plane, to carry additional auxiliary hardware. (The terminology "breadboard" is used for both optical table and auxiliary mounting plates.) Optical components interface with the breadboard through their mounts by having their mountings provided with ¼ inch holes (6 mm holes for metric systems) on integral inch (or 25 mm) unit intervals, or by a commonly used system of stand-off posts and post-holders. Socket head cap screws are most commonly used to securely bolt these components to the breadboards. A socket head cap screw has a hex socket in its cylindrical, flat-bottomed head and provides good lock-down when passed through a counter-bored hole or slot and threaded into a tapped hole.

Optical researchers in the United States have widely accepted breadboard arrays of ¼-20 UNC tapped holes on 1 inch centers as the de facto standard; but metric arrays are also sometimes used. Most optical component and mount manufacturers design their products to mount directly to one of these standard breadboards. Since these breadboards are essentially two-dimensional, less standardized and more expensive right-angle adapters must be used to create three-dimensional or multilayer optical layouts. These adapters are usually machined castings, which are considerably more expensive than the essentially two-dimensional mounting plates and posts. Thus, while current methods of mounting optical components work satisfactorily, their disadvantages include high cost and insufficient standardization of mounting hardware.

The need has been long felt for a more standardized and economical way of building three-dimensional optical layouts. As described above, this need stems from:

the convenience of mounting subassemblies of complex optical layouts on smaller breadboards;

the need for mounting optical components and hardware at right angles or at different heights;

the expense of maintaining an inventory of specialized hardware;

the need for greater functionality of mounting hardware at reduced cost.

DISCLOSURE OF INVENTION

It is the object of the invention to provide a novel set of universal mounting component (UMC) blocks which are inexpensive and easily assembled into a great number of three-dimensional configurations.

Another object of the invention is to eliminate the need to purchase and store a large number of more specialized items of mounting hardware in favor of universal mounting component (UMC) blocks.

A feature of the invention is the use of rectangular blocks of metal with a minimum number of tapped or counter-bored holes, to provide an optimum cost/functionality ratio.

Another feature of the invention is the use of a single thickness of block for components regardless of size.

An advantage of the invention is the versatility of the new components: numerous three-dimensional mounting configurations can be quickly realized with a set of basic universal mounting components.

Another advantage of the invention is that it significantly reduces the need for different right-angle mounting fixtures.

Other objects, features and advantages of the invention will be apparent from the following written description, claims, abstract and the annexed drawings.

BEST MODE FOR CARRYING OUT THE INVENTION

This invention allows for the construction of three-dimensional optical layouts using standard mounting breadboards as the base. It minimizes the need for expensive right angle brackets, pedestals and posts for most applications by employing a small number of universal mounting component (UMC) blocks which can be mounted to standard breadboards, and to each other, either lying flat or standing on edge. Such edge mounting is facilitated by two appropriately tapped holes in one side of each UMC block. Other holes, on both front and back of each UMC block, are counter-bored to allow for mounting in any of several orientations without the problem of obtruding bolt heads. It is this arrangement of edge holes and oppositely counter-bored holes which makes the UMC block system so versatile.

Figure 1:
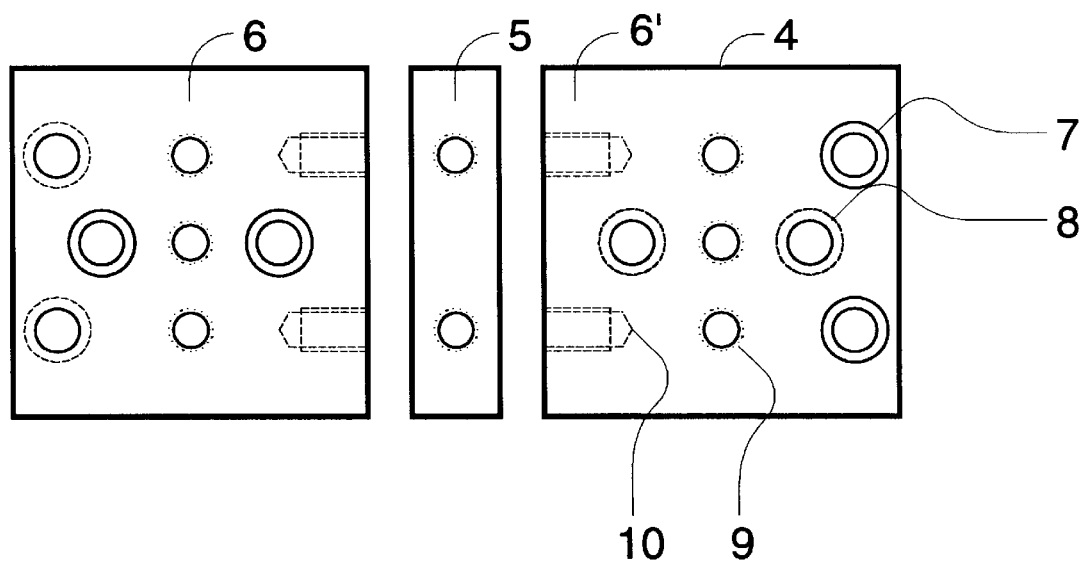
FIG. 1 is a three-position elevation view of the preferred embodiment, showing front, edge and back of the 2×2 Universal Mounting Component (UMC) block.
Figure 2:
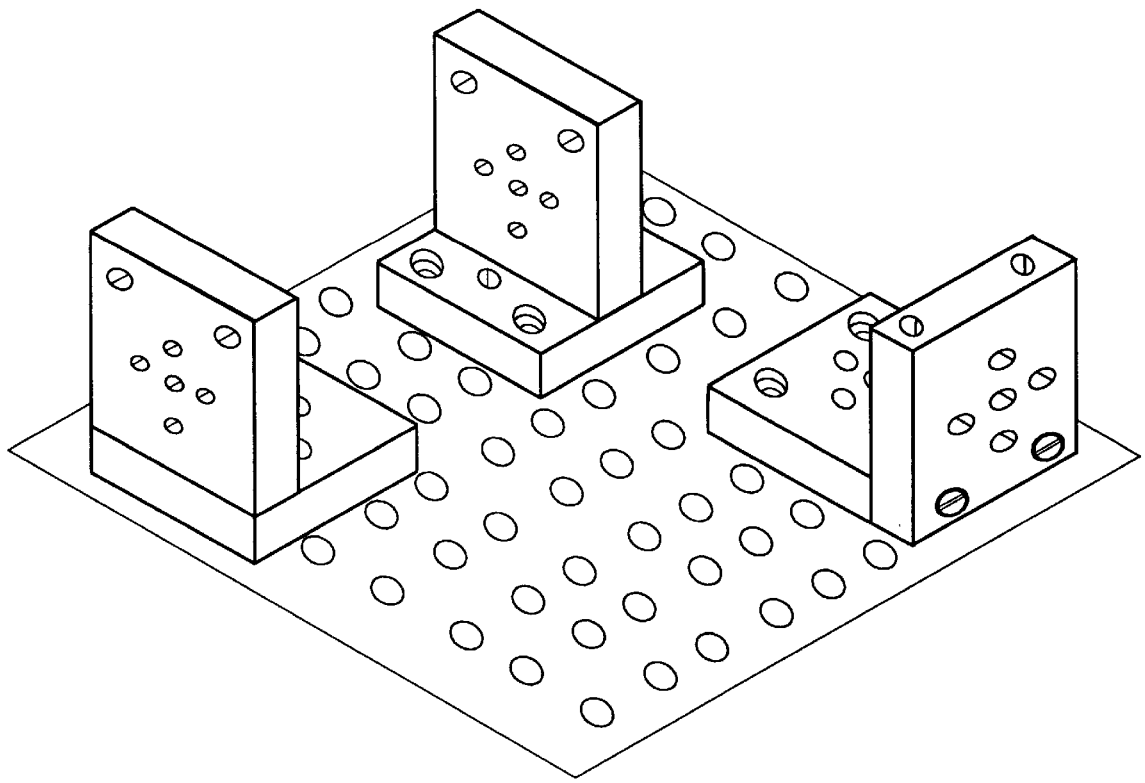
FIG. 2 is a demonstration isometric view of a tabletop portion with three differing configurations assembled from 2×2 UMC blocks.
Figure 3:
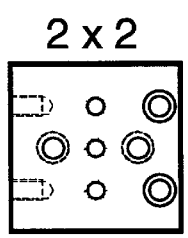
FIG. 3 is an eight-piece set of UMC blocks.
Figure 3:
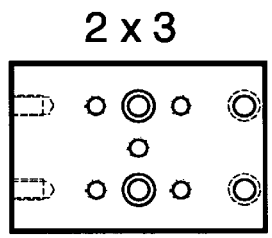
Figure 3:
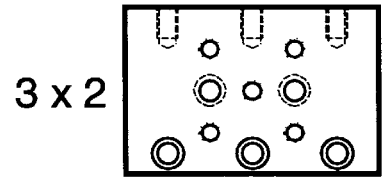
Figure 3:
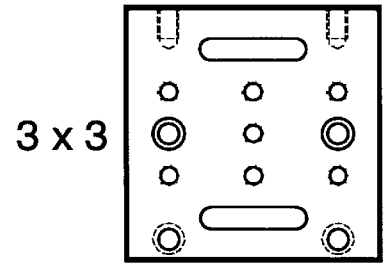
Figure 3:
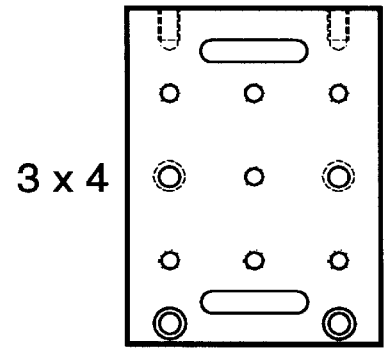
Figure 3:
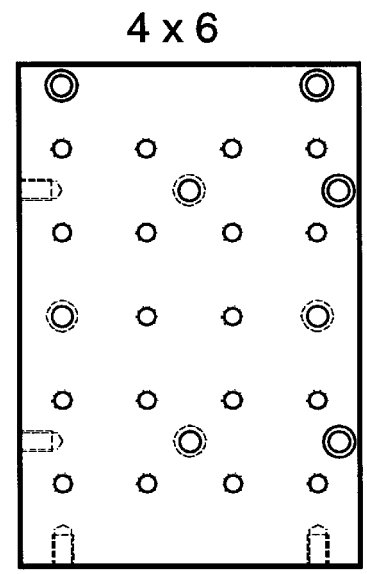
Figure 3:
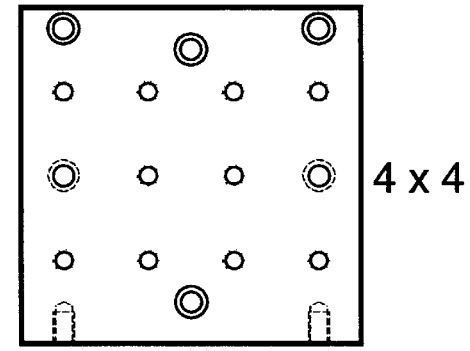
Figure 3:
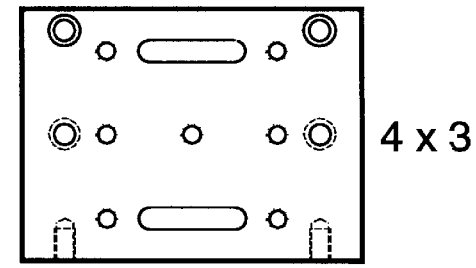

FIGS. 1 and 2 show the design and function of the smallest component of the set of eight UMC blocks. (The entire system is shown in FIG. 3.) The front 4, left 5, and back 6 of the 2×2 UMC block are shown. The 2×2 UMC block is preferably anodized aluminum, but may be of other suitable material, and has the following holes located on chosen intersections of a quarter-unit grid (where the unit is either one inch for standard or 25 mm for metric) on the front, back and at least one edge, as follows:

a) two counter-bored holes dimensioned to accommodate standard ¼-20 socket head cap screws from the front 7;

b) two identical counter-bored holes from the back 8;

c) three ¼-20 UNC tapped through holes 9 for mounting; and d) two blind ¼-20 UNC tapped holes from the left 10 for building up three-dimensional configurations NOTE: (To design this part for the metric standard, all tapped holes only need to be changed to M6 and located on corresponding quarter of 25 mm grid intersections.)

FIG. 2 shows how the 2×2 components may be attached in pairs to 2×2 clones, and to a standard breadboard base, to form three-dimensional right angle mounting structures.

FIG. 3 shows front views of a set of eight components of varying sizes, all of which have the same thickness (preferably ½ inch). Any two having a compatible side length can be combined into right angle structures similar to those illustrated in FIG. 2.

The subset of eight UMC blocks is designed to minimize the number of holes that need to be drilled in the bulk material of the UMC blocks and to keep the cost of manufacture, inventory and delivery low. At the same time, the number and position of useful tapped mounting holes is optimized. Additionally, all "standard" UMC blocks can be mounted on standard ¼-20, inch center breadboards, If a metric breadboard is to be used, a subset of metric UMC blocks is similar but with a slightly altered measurement unit. Furthermore, in making the UMC blocks, outer dimensions of each UMC block are specified and toleranced so that UMC blocks may be mounted side by side on an optical table with a small clearance (i.e., no interference) between adjacent blocks.

Use of the UMC blocks facilitates the process of building up optical setups in a number of ways. In particular, the UMC blocks may be mounted to the table and also to each other in T-shaped and L-shaped configurations. Optical components may then be mounted to the UMC blocks. Because the UMC blocks have strategically placed counter-bored holes 7 and 8 and tapped holes 10, the bolts that are used to connect UMC blocks to each other are fully recessed. Thus, there is no interference with a flat-to-flat planar fit of a base UMC block to a breadboard, since the orthogonal UMC block is held by fully recessed bolts. Such subassemblies of UMC blocks may be used to mount optical components at right angles or at different heights. The placement of sets of counter-bored through-holes 7 and 8 on opposing faces of each UMC block adds to the utility of T-shaped and L-shaped configurations. As shown in FIG. 2, for example, even when UMC blocks are connected, at least one set of counter-bored through-holes is available on a base block to enable the user to bolt the T-shaped or L-shaped configuration to the table. Furthermore, the oppositely counter-bored sets of through-holes 7 and 8 allow the user to flip over the blocks in order to find the optimal way in which to connect blocks to each other or to other optical components. In addition, since the UMC blocks are right rectangular solids, they can be built up at right angles into larger structures.

Thus, the invention satisfies a need for economical optical mounting hardware that can be used in a wide variety of configurations to facilitate the set-up, precision and reproducibility of three-dimensional optical layouts.

INDUSTRIAL APPLICABILITY

The invention is capable of being used by optical researchers and system designers for mounting optical elements for experiments and breadboard-type prototype constructions using laser beams or other light beams which must be steered about complex paths. Because the invention comprises a set of UMC blocks which are capable of being assembled into a great number of three-dimensional configurations, the invention provides a more standardized and economical inventory of hardware for building three-dimensional optical standoffs. The very simplicity of the design is useful, not only because of the number of customized configurations in which the component parts may be assembled, but also because the invention obviates the need for users to invest in and store a large number of more specialized items of mounting hardware.

What is claimed is:

1. A three-dimensional universal mounting component (UMC) system for optical breadboards, having at least one subset of related UMC blocks, each UMC block having a plurality of openings at unit distances matching tapped hole grid configurations for mounting optical elements, and each having capability for mounting to an optical table and to a mating UMC block, characterized by:

each UMC block (4) in each subset being a right parallelepiped having opposing first and second parallel planar surfaces (6; 6') and having first (5) and second orthogonal parallel pairs of edge surfaces, with a standard edge thickness, having a plurality of tapped holes (9) at standardized intervals, extending from said first planar surface (6) to said second planar surface (6') in a configuration appropriate for mounting optical elements, having at least one set of tapped holes (10) in at least one edge surface (5) extending into the UMC block (4), and having at least two oppositely-counter-bored sets (7; 8) of counter-bored through-holes passing through said each UMC block (4) from first planar surface (6) to said second planar surface (6') for each set of tapped holes (10), one set of counter-bored through-holes (7) being near the edge opposite said tapped holes (10) and on equal centers to said tapped holes (10) to provide for an L-configuration assembly, and the other set of counter-bored through-holes (8) being centrally located and on equal centers to said tapped holes (10) to provide for a T-configuration assembly.

2. A three-dimensional Universal Mounting Component (UMC) system according to claim 1, further characterized by:

a subset of at least one UMC block with 2×2 unit span and a 1-unit mounting-bolt interval.

3. A three-dimensional Universal Mounting Component (UMC) system according to claim 1, further characterized by:

a subset of at least one UMC block with a 2×3 unit span and a 1-unit mounting-bolt interval.

4. A three-dimensional Universal Mounting Component (UMC) system according to claim 1, further characterized by:

a subset of at least one UMC block with a 3×3 unit span and a 2-unit mounting-bolt interval.

5. A three-dimensional Universal Mounting Component (UMC) system according to claim 1, further characterized by:

a subset of at least one UMC block with a 3×4 unit span and a 2-unit mounting-bolt interval.

6. A three-dimensional Universal Mounting Component (UMC) system according to claim 1, further characterized by:

a subset of at least one UMC block with a 4×3 unit span and a 3-unit mounting-bolt interval.

7. A three-dimensional Universal Mounting Component (UMC) system according to claim 1, further characterized by:

a subset of at least one UMC block with a 4×4 unit span and a 3-unit mounting-bolt interval.

8. A three-dimensional Universal Mounting Component (UMC) system according to claim 1, further characterized by:

a subset of at least one transitional UMC block with 3×2 unit span and a 1-unit mounting-bolt interval, with said set of tapped holes (10) spaced at a 2-unit mounting-bolt interval in said edge surface (5), and said set of counter-bored through-holes (7) near the edge opposite said tapped holes also spaced at a 2-unit mounting-bolt interval.

9. A three-dimensional Universal Mounting Component (UMC) system according to claim 1, further characterized by a subset of at least one transitional UMC block with a 4×6 unit span and a 3-unit mounting-bolt interval, comprising:

a) a first set of tapped holes (10) spaced at a 3-unit mounting-bolt interval in a short edge surface, and a first set of counter-bored through-holes (7) near the edge opposite said first set of tapped holes (10) also spaced at a 3-unit mounting-bolt interval;

b) a second set of tapped holes (10) spaced at a 3-unit mounting-bolt interval in a long edge surface, and a second set of counter-bored through-holes (7) near the edge opposite said second set of tapped holes (10) also spaced at a 3-unit mounting-bolt interval;

c) a first set of oppositely-counter-bored through-holes centered across the short dimension of said block spaced at a 3-unit mounting-bolt interval;

d) a second set of oppositely-counter-bored through-holes centered across the long dimension of said block spaced at a 3-unit mounting-bolt interval.

10. A set of right rectangular blocks for mounting optical components, wherein each said block comprises:

an array of tapped holes on unit centers;

two pairs of oppositely counter-bored holes located on chosen intersections of a quarter-unit grid on the faces of each said block for accepting mounting bolts with bolt heads fully recessed;

one set of two tapped holes centered one unit apart in one side edge of said block for accepting mounting bolts; whereby said blocks may be combined in a plurality of combinations for creating customized three-dimensional optical layouts.

11. A three-dimensional Universal Mounting Component (UMC) system for optical breadboards, having a number of openings in grid configurations for mounting optical elements, characterized by:

a) a first subset of UMC blocks with a 2-unit span and a 1-unit mounting-bolt interval;

b) a second subset of UMC blocks with a 3-unit span and a 2-unit mounting-bolt interval;

c) a third subset of UMC blocks with a 4-unit span and a 3-unit mounting-bolt interval; and d) a fourth subset of UMC transition blocks each with an n×m unit span and an (n−1)-unit mounting-bolt interval, and an additional mounting bolt interval positioned to enable mounting in any of several orientations; each UMC block (4) in each subset having opposing first and second parallel planar surfaces (6; 6') and having first (5) and second parallel pairs of edge surfaces, with a standard edge thickness, having a plurality of tapped holes (9) at standardized intervals, extending from said first planar surface (6) to said second planar surface (6') in a configuration appropriate for mounting optical elements, having at least one set of tapped holes (10) in at least one edge surface (5) extending into said UMC block (4), and having at least two oppositely-counter-bored sets (7; 8) of counter-bored through-holes passing through said each UMC block (4) from first planar surface (6) to said second planar surface (6') for each set of tapped holes (10), one set of counter-bored through-holes (7) being near the edge opposite said tapped holes (10) and on equal centers to said tapped holes (10) to provide for an L-configuration assembly, and the other set of counter-bored through-holes (8) being centrally located and on equal centers to said tapped holes (10) to provide for a T-configuration assembly.

\* \* \* \* \*